United States Patent
Cameron et al.

(10) Patent No.: US 7,350,028 B2
(45) Date of Patent: Mar. 25, 2008

(54) USE OF A TRANSLATION CACHEABLE FLAG FOR PHYSICAL ADDRESS TRANSLATION AND MEMORY PROTECTION IN A HOST

(75) Inventors: Donald F. Cameron, Portland, OR (US); Frank L. Berry, Cornelius, OR (US)

(73) Assignee: Intel Corporation, Santa Clara, CA (US)

( * ) Notice: Subject to any disclaimer, the term of this patent is extended or adjusted under 35 U.S.C. 154(b) by 280 days.

(21) Appl. No.: 09/466,180

(22) Filed: Dec. 17, 1999

(65) Prior Publication Data
US 2003/0163647 A1    Aug. 28, 2003

Related U.S. Application Data

(60) Provisional application No. 60/135,259, filed on May 21, 1999.

(51) Int. Cl.
*G06F 12/12* (2006.01)
*G06F 15/16* (2006.01)

(52) U.S. Cl. .................. 711/135; 711/206; 709/250

(58) Field of Classification Search .............. 711/3, 711/133–136, 144–145, 159–160, 205–207, 711/163–164, 152, 211; 709/250, 208, 216, 709/225; 710/305–306, 62–63, 72–74, 309, 710/311–313, 315, 36
See application file for complete search history.

(56) References Cited

U.S. PATENT DOCUMENTS

| | | | | |
|---|---|---|---|---|
| 5,208,810 A | | 5/1993 | Park | 370/230 |
| 5,475,433 A | | 12/1995 | Jeong | 375/240.05 |
| 5,550,957 A | * | 8/1996 | Davidson, Jr. et al. | 358/1.15 |
| 5,633,870 A | * | 5/1997 | Gaytan et al. | 370/235 |
| 5,777,624 A | | 7/1998 | Munson | 345/605 |
| 5,835,963 A | * | 11/1998 | Yoshioka et al. | 711/207 |
| 5,937,436 A | * | 8/1999 | Watkins | 711/202 |
| 5,991,797 A | * | 11/1999 | Futral et al. | 709/216 |
| 6,112,263 A | * | 8/2000 | Futral | 710/37 |
| 6,125,433 A | * | 9/2000 | Horstmann et al. | 711/160 |
| 6,163,834 A | * | 12/2000 | Garcia et al. | 711/206 |

* cited by examiner

*Primary Examiner*—Denise Tran
(74) *Attorney, Agent, or Firm*—Kenyon & Kenyon LLP (57) ABSTRACT

A host coupled to a switched fabric including one or more fabric-attached I/O controllers. Such a host may comprise a processor; a host memory coupled to the processor; and a host-fabric adapter coupled to the host memory and the processor and provided to interface with the switched fabric, which caches selected translation and protection table (TPT) entries from the host memory for a data transaction, and flushes individual cached translation and protection table (TPT) entry in accordance with a translation cacheable flag.

24 Claims, 11 Drawing Sheets

EXAMPLE SOFTWARE DRIVER STACKS FOR HOST HAVING FABRIC-ATTACHED I/O

USE OF A TRANSLATION CACHEABLE FLAG FOR PHYSICAL ADDRESS TRANSLATION AND MEMORY PROTECTION IN A HOST

CLAIM FOR PRIORITY

This application makes reference to, incorporates the same herein, and claims all benefits accruing under 35 U.S.C. § 120 from an application for NGIO Software Channel Inventions filed on May 21, 1999 and there duly assigned Ser. No. 60/135,259.

TECHNICAL FIELD

The present invention relates to a data network, and more particularly, relates to the use of a translation cacheable flag in a host for physical address translation and memory protection.

BACKGROUND

In many prior network architectures, the operating system (OS) virtualizes network hardware into a set of logical communication endpoints and multiplexes access to the hardware among these endpoints (e.g., computers, servers and/or I/O devices). The operating system (OS) may also implement protocols that make communication between connected endpoints reliable (e.g., transmission control protocol, TCP).

Generally, the operating system (OS) receives a request to send a message (data) and a virtual address that specifies the location of the data associated with the message, copies the message into a message buffer and translates the virtual address. The OS then schedules a memory copy operation to copy data from the message buffer memory to a target device. Translation and protection table (TPT) may be used to translate the virtual address, received in the form of descriptors, into physical addresses and to define memory regions before a host network adapter can access them (e.g., for transfer to/from a remote device) during data transfer (movement) operations. However, access time of the translation and protection table (TPT) by the host network adapter may be considerably lengthy, contributing significantly to the software overhead associated with data transfer operations. Accordingly, there is a need for a more efficient technique of using and accessing the translation and protection table (TPT) to perform virtual to physical address translations while providing memory access protection during data transfer operations.

SUMMARY

Accordingly, various embodiments of the present invention are directed to a host coupled to a switched fabric including one or more fabric-attached I/O controllers. Such a host may comprise a processor; a host memory coupled to the processor; and a host-fabric adapter coupled to the host memory and the processor and provided to interface with the switched fabric, which caches selected translation and protection table (TPT) entries from the host memory for a data transaction via the switched fabric, and flushes individual cached translation and protection table (TPT) entry in accordance with a translation cacheable flag.

BRIEF DESCRIPTION OF THE DRAWINGS

A more complete appreciation of exemplary embodiments of the present invention, and many of the attendant advantages of the present invention, will become readily apparent as the same becomes better understood by reference to the following detailed description when considered in conjunction with the accompanying drawings in which like reference symbols indicate the same or similar components, wherein.

DETAILED DESCRIPTION

The present invention is applicable for use with all types of data networks and clusters designed to link together computers, servers, peripherals, storage devices, and communication devices for communications. Examples of such data networks may include a local area network (LAN), a wide area network (WAN), a campus area network (CAN), a metropolitan area network (MAN), a global area network (GAN), a storage area network and a system area network (SAN), including newly developed data networks using Next Generation I/O (NGIO) and Future I/O (FIO) and Server Net and those networks which may become available as computer technology develops in the future. LAN system may include Ethernet, FDDI (Fiber Distributed Data Interface) Token Ring LAN, Asynchronous Transfer Mode (ATM) LAN, Fiber Channel, and Wireless LAN. However, for the sake of simplicity, discussions will concentrate mainly on exemplary use of a simple data network having several example hosts and I/O units including I/O controllers that are linked together by an interconnection fabric, although the scope of the present invention is not limited thereto.

Figure 1:
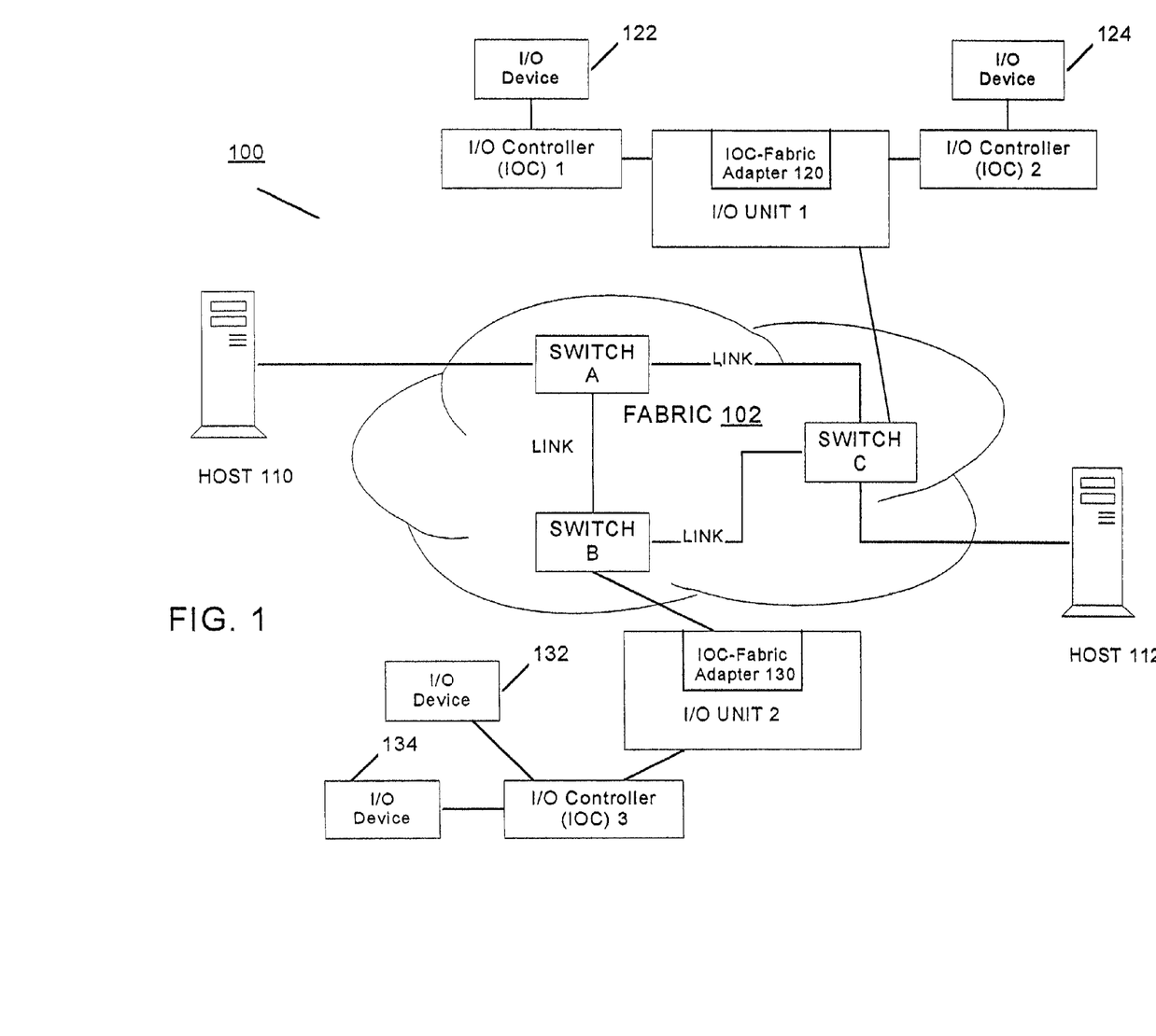
FIG. 1 illustrates an example data network according to an embodiment of the present invention.

Attention now is directed to the drawings and particularly to FIG. 1, an example data network having several interconnected endpoints (nodes) for data communications is illustrated. As shown in FIG. 1, the data network 100 may include, for example, an interconnection fabric (hereinafter referred to as "switched fabric") 102 of one or more switches A, B and C and corresponding physical links, and several endpoints (nodes) which may correspond to one or more I/O units 1 and 2, computers and servers such as, for example, host 110 and host 112. I/O unit 1 may include one or more controllers connected thereto, including I/O controller 1 (IOC1) and I/O controller 2 (IOC2). Likewise, I/O unit 2 may include an I/O controller 3 (ICO3) connected thereto. Each I/O controller 1, 2 and 3 (IOC1, IOC2 and IOC3) may operate to control one or more I/O devices. For example, I/O controller 1 (IOC1) of the I/O unit 1 may be connected to I/O device 122, while I/O controller 2 (IOC2) may be connected to I/O device 124. Similarly, I/O controller 3 (IOC3) of the I/O unit 2 may be connected to I/O devices 132 and 134. The I/O devices may be any of several types of I/O devices, such as storage devices (e.g., a hard disk drive, tape drive) or other I/O device.

The hosts and I/O units including attached I/O controllers and I/O devices may be organized into groups known as clusters, with each cluster including one or more hosts and typically one or more I/O units (each I/O unit including one or more I/O controllers). The hosts and I/O units may be interconnected via a switched fabric 102, which is a collection of switches A, B and C and corresponding physical links connected between the switches A, B and C.

In addition, each I/O unit includes one or more I/O controller-fabric (IOC-fabric) adapters for interfacing between the switched fabric 102 and the I/O controllers (e.g., IOC1, IOC2 and IOC3). For example, IOC-fabric adapter 120 may interface the I/O controllers 1 and 2 (IOC1 and IOC2) of the I/O unit 1 to the switched fabric 102, while IOC-fabric adapter 130 interfaces the I/O controller 3 (IOC3) of the I/O unit 2 to the switched fabric 102.

The specific number and arrangement of hosts, I/O units, I/O controllers, I/O devices, switches and links shown in FIG. 1 is provided simply as an example data network. A wide variety of implementations and arrangements of any number of hosts, I/O units, I/O controllers, I/O devices, switches and links in all types of data networks may be possible.

Figure 2:
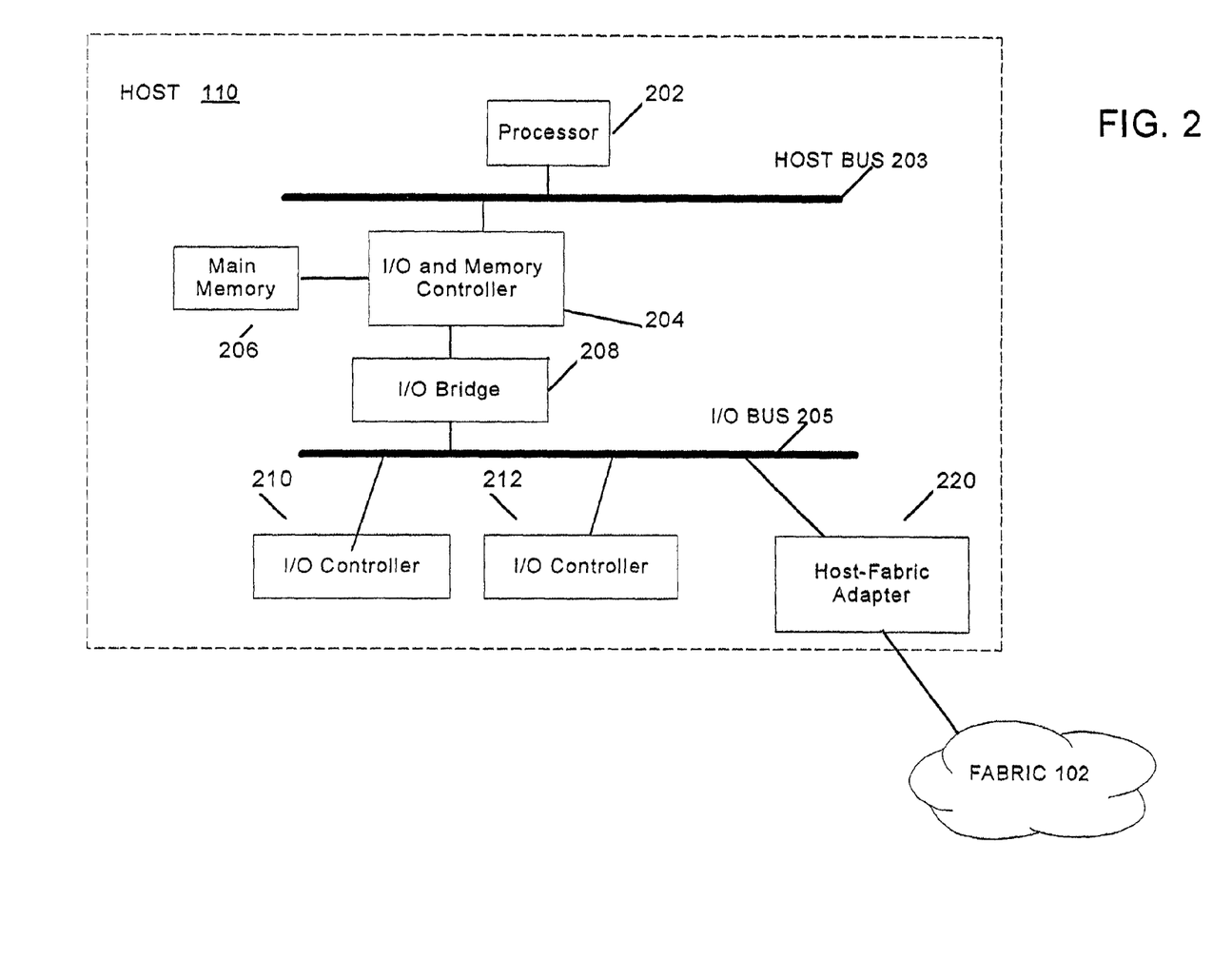
FIG. 2 illustrates a block diagram of a host of an example data network according to an embodiment of the present invention.

An example embodiment of a host (e.g., host 110 or host 112) may be shown in FIG. 2. Referring to FIG. 2, a host 110 may include a processor 202 coupled to a host bus 203. An I/O and memory controller 204 (or chipset) may be connected to the host bus 203. A main memory 206 may be connected to the I/O and memory controller 204. An I/O bridge 208 may operate to bridge or interface between the I/O and memory controller 204 and an I/O bus 205. Several I/O controllers may be attached to I/O bus 205, including an I/O controllers 210 and 212. I/O controllers 210 and 212 (including any I/O devices connected thereto) may provide bus-based I/O resources.

One or more host-fabric adapters 220 may also be connected to the I/O bus 205. Alternatively, the host-fabric adapter 220 may be connected directly to the I/O and memory controller (or chipset) 204 to avoid the inherent limitations of the I/O bus 205 (see FIG. 3). In either situation, the host-fabric adapter 220 may be considered to be a type of a network interface card (e.g., NIC which usually includes hardware and firmware) for interfacing the host 110 to a switched fabric 102. The host-fabric adapter 220 may be utilized to provide fabric communication capabilities for the host 110. For example, the host-fabric adapter 220 converts data between a host format and a format that is compatible with the switched fabric 102. For data sent from the host 110, the host-fabric adapter 220 formats the data into one or more packets containing a sequence of one or more cells including header information and data information.

According to one example embodiment or implementation, the hosts or I/O units of the data network of the present invention may be compatible with the "*Next Generation Input/Output (NGIO) Specification*" as set forth by the NGIO Forum on Mar. 26, 1999. According to the NGIO Specification, the switched fabric 102 may be an NGIO fabric, the host-fabric adapter 220 may be a Host Channel Adapter (HCA), and the IOC-fabric adapters may be Target Channel Adapters (TCA). The host channel adapter (HCA) may be used to provide an interface between the host 110 or 112 and the switched fabric 102 via high speed serial links. Similarly, target channel adapters (TCA) may be used to provide an interface between the switched fabric 102 and the I/O controller of either an I/O unit 1 or 2, or another network, including, but not limited to, local area network (LAN), wide area network (WAN), Ethernet, ATM and fibre channel network, via high speed serial links. Both the host channel adapter (HCA) and the target channel adapter (TCA) may be implemented in compliance with "*Next Generation I/O Architecture: Host Channel Adapter Software Specification, Revision 1.0*" as set forth by Intel Corp., on May 13, 1999. In addition, each NGIO host may contain one or more host-fabric adapters (e.g., HCAs). However, NGIO is merely one example embodiment or implementation of the present invention, and the invention is not limited thereto. Rather, the present invention may be applicable to a wide variety of data networks, hosts and I/O controllers.

Figure 3:
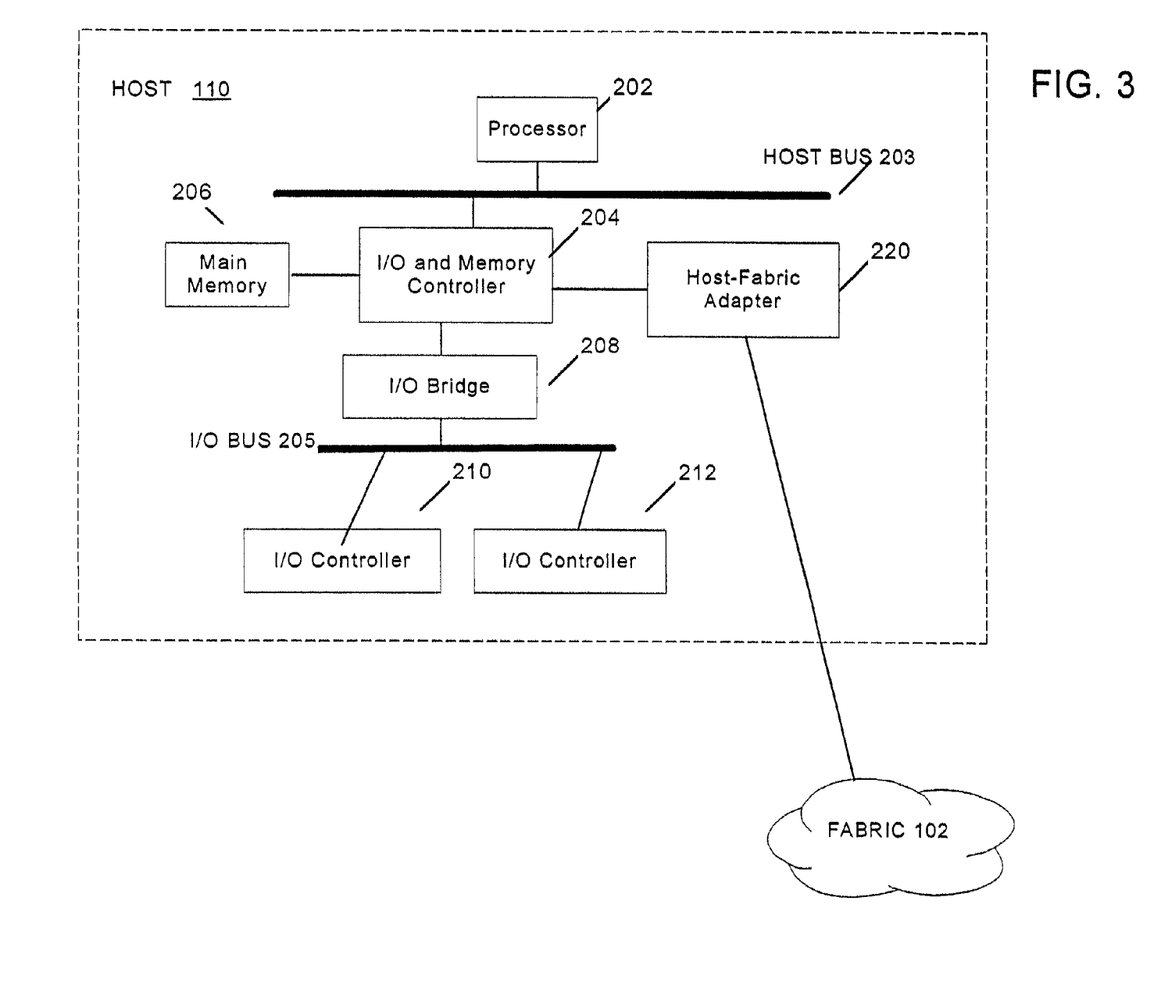
FIG. 3 illustrates a block diagram of a host of an example data network according to another embodiment of the present invention.

As described with reference to FIGS. 2-3, the I/O units and respective I/O controllers may be connected directly to the switched fabric 102 rather than as part of a host 110. For example, I/O unit 1 including I/O controllers 1 and 2 (IOC1 and IOC2) and I/O unit 2 including an I/O controller 3 (IOC3) may be directly (or independently) connected to the switched fabric 102. In other words, the I/O units (and their connected I/O controllers and I/O devices) are attached as separate and independent I/O resources to the switched fabric 102 as shown in FIGS. 1-3, as opposed to being part of a host 110. As a result, I/O units including I/O controllers (and I/O devices) connected to the switched fabric 102 may be flexibly assigned to one or more hosts (rather than having a predetermined or fixed host assignment based upon being physically connected to the host's local I/O bus). The I/O units, I/O controllers and I/O devices which are attached to the switched fabric 102 may be referred to as fabric-attached I/O resources (i.e., fabric-attached I/O units, fabric-attached I/O controllers and fabric-attached I/O devices) because these components are directly attached to the switched fabric 102 rather than being connected as part of a host.

In addition, the host 10 may detect and then directly address and exchange data with I/O units and I/O controllers (and attached I/O devices) which are directly attached to the switched fabric 102 (i.e., the fabric-attached I/O controllers), via the host-fabric adapter 220. Software driver stack for the host-fabric adapter 220 may be provided to allow host 110 to exchange data with remote I/O controllers and I/O devices via the switched fabric 102, while preferably being compatible with many currently available operating systems, such as Windows 2000.

Figure 4:
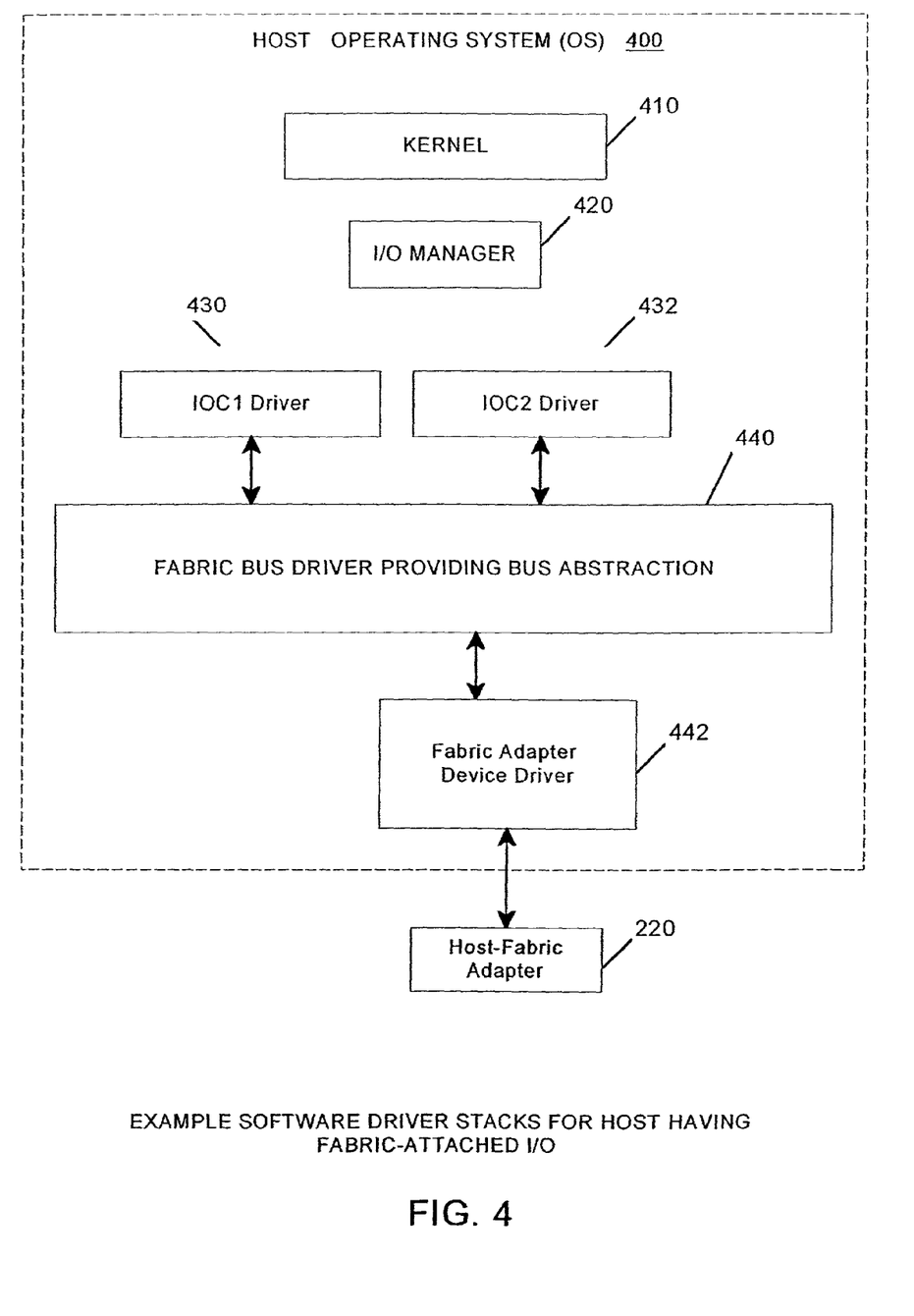
FIG. 4 illustrates an example software driver stack of a host of an example data network according to an embodiment of the present invention.

FIG. 4 illustrates an example software driver stack of a host 10 having fabric-attached I/O resources according to an example embodiment of the present invention. As shown in FIG. 4, the host operating system (OS) 400 includes a kernel 410, an I/O manager 420, and a plurality of I/O controller drivers for interfacing to various I/O controllers, including I/O controller drivers 430 and 432. According to an example embodiment, the host operating system (OS) 400 may be Windows 2000 and the I/O manager 420 may be a Plug-n-Play manager.

In addition, fabric adapter driver software module may be provided to access the switched fabric 102 and information about fabric configuration, fabric topology and connection information. Such driver software module may include a fabric bus driver (upper driver) 440 and a fabric adapter device driver (lower driver) 442 utilized to establish communication with a target fabric-attached agent (e.g., I/O controller), and perform functions common to most drivers, including, for example, channel abstraction, send/receive transaction messages, remote direct memory access (RDMA) transactions (e.g., read and write operations), queue management, memory registration, descriptor management, message flow control, and transient error handling and recovery. Such software module may be provided on a tangible medium, such as a floppy disk or compact disk (CD) ROM, or via Internet downloads, which may be available for plug-in or download into the host operating system (OS).

According to a preferred embodiment of the present invention, the host 110 may communicate with I/O units and I/O controllers (and attached I/O devices) which are directly attached to the switched fabric 102 (i.e., the fabric-attached I/O controllers) using a Virtual Interface (VI) architecture. Under the "*Virtual Interface (VI) Architecture Specification, Version* 1.0," as set forth by Compaq Corp., Intel Corp., and Microsoft Corp., on Dec. 16, 1997 the VI architecture comprises four basic components: virtual interface (VI) of pairs of works queues (send queue and receive queue), VI consumer which may be an application program, VI provider which may be hardware and software components responsible for instantiating VI, and completion queue (CQ). VI is the mechanism that allows VI consumer to directly access VI provider. Each VI represents a communication endpoint, and endpoint pairs may be logically connected to support bidirectional, point-to-point data transfer. Under the VI architecture, the host-fabric adapter 220 and VI Kernel agent may constitute the VI provider to perform endpoint virtualization directly and subsume the tasks of multiplexing, de-multiplexing, and data transfer scheduling normally performed by the host operating system (OS) kernel 410 and device driver 442 as shown in FIG. 4.

Figure 5:
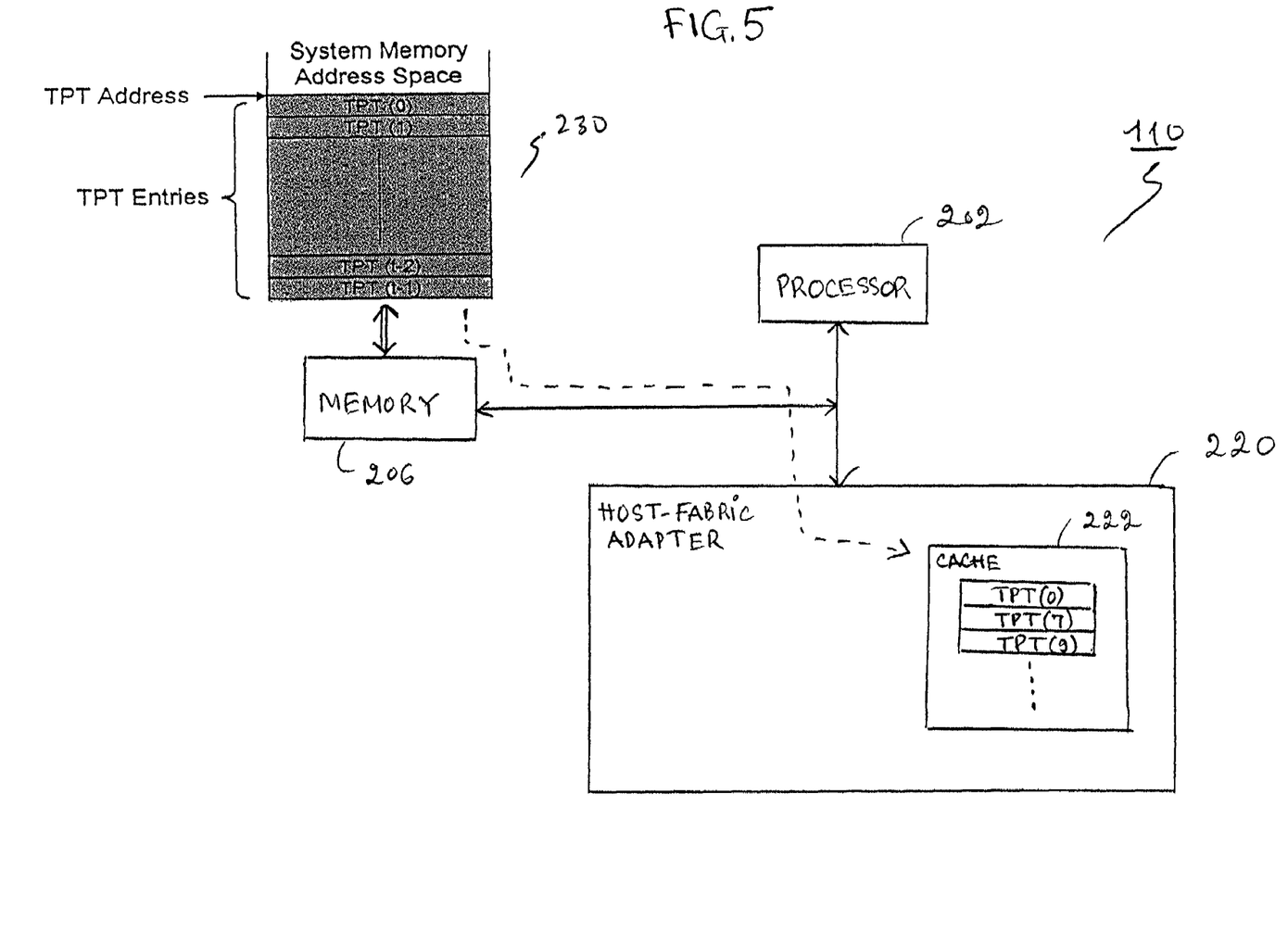
FIG. 5 illustrates an example host-fabric adapter and an example translation and protection table (TPT) of a host of an example data network according to an embodiment of the present invention.

Translation and protection table (TPT) 230 as shown in FIG. 5 may be used to translate virtual address, received in a form of packet descriptors (e.g., a data structure that describes a request to move data), into physical addresses and to define memory regions of host memory 206 that may be accessed by the host-fabric adapter 220 (validate access to host memory). In addition, the translation and protection table (TPT) 230 may also be used to validate access permission and rights of the host-fabric adapter 220 and to perform address translation before accessing any other memory in the host 110. The translation and protection table (TPT) 230 may contain a plurality of TPT entries, for example, TPT(0), TPT(1) . . . TPT(t−2) and TPT(t−1), in the system memory address space. Each TPT entry may represent a single page of host memory 206, typically 4 KB of physically contiguous host memory 206. Usually, the TPT table 230 is stored within the host memory 206. Alternatively, such a TPT table 230 may also be stored in a different memory area of the host 110. In either situation, however, the access time to the TPT table 230 by the host-fabric adapter 220 may be considerably lengthy, thereby contributing significantly to the software overhead associated with data transfer operations (e.g., send, receive, RDMA write, and RDMA read). This is because the I/O request must be forwarded or transported from the host-fabric adapter 220 onto the I/O bus 205, typically through the I/O bridge 208 and the I/O and memory controller 204, to the host memory 206, and then such data must be sent back to the host-fabric adapter 220, again through the I/O and memory controller 204 and the I/O bridge 208.

In order to lessen the impact of slow access time to the TPT table 230 of the host memory 206 for each I/O transaction, the host-fabric adapter 220 may advantageously maintain an internal cache 222 which contains only a subset of TPT entries being used for current I/O transactions, such as, for example, TPT(0), TPT(7) and TPT(9) which represent different pages of registered memory. Since cache memory is a cost-prohibitive fast memory, usually made up of static random-access-memories (SRAMs), only a limited size cache 222 may be utilized to store selected TPT entries from the TPT table 230 for future re-use. Although the use of such cache 222 within the host-fabric adapter 220 speeds up the data transfer operations, all cached translation entries including TPT(0), TPT(7) and TPT(9) in the cache 222 must be flushed or discarded at the end of each I/O transaction by the host-fabric adapter 220 if the TPT entries were configured to allow caching of the entries by the host-fabric adapter 220. In addition, all cached translation entries must also be flushed or discarded if the cache 222 becomes full, or the virtual/physical address of a TPT entry is changed over time such that the TPT entry within the cache 222 is no longer coincide with the TPT entry within the TPT table 230 of the host memory 206. Host-fabric adapter 220 may not access individual TPT entries within the cache 222 to flush or discard a single TPT entry. Such wholesale flushing of the entire contents of the cache 222 may not be desirable since the flushing frequency per I/O transaction is high and host memory needs frequent mapping and re-mapping per I/O transaction prior to configuration. Moreover, there may be a significant delay (dead time) for reloading usable TPT entries after each time all cached translations are flushed or discarded from the cache 222 of the host-fabric adapter 220. Accordingly, mechanism must be provided to drastically reduce the number of times the host-fabric adapter 220 to flush cached address translations in the cache 222.

Figure 6:
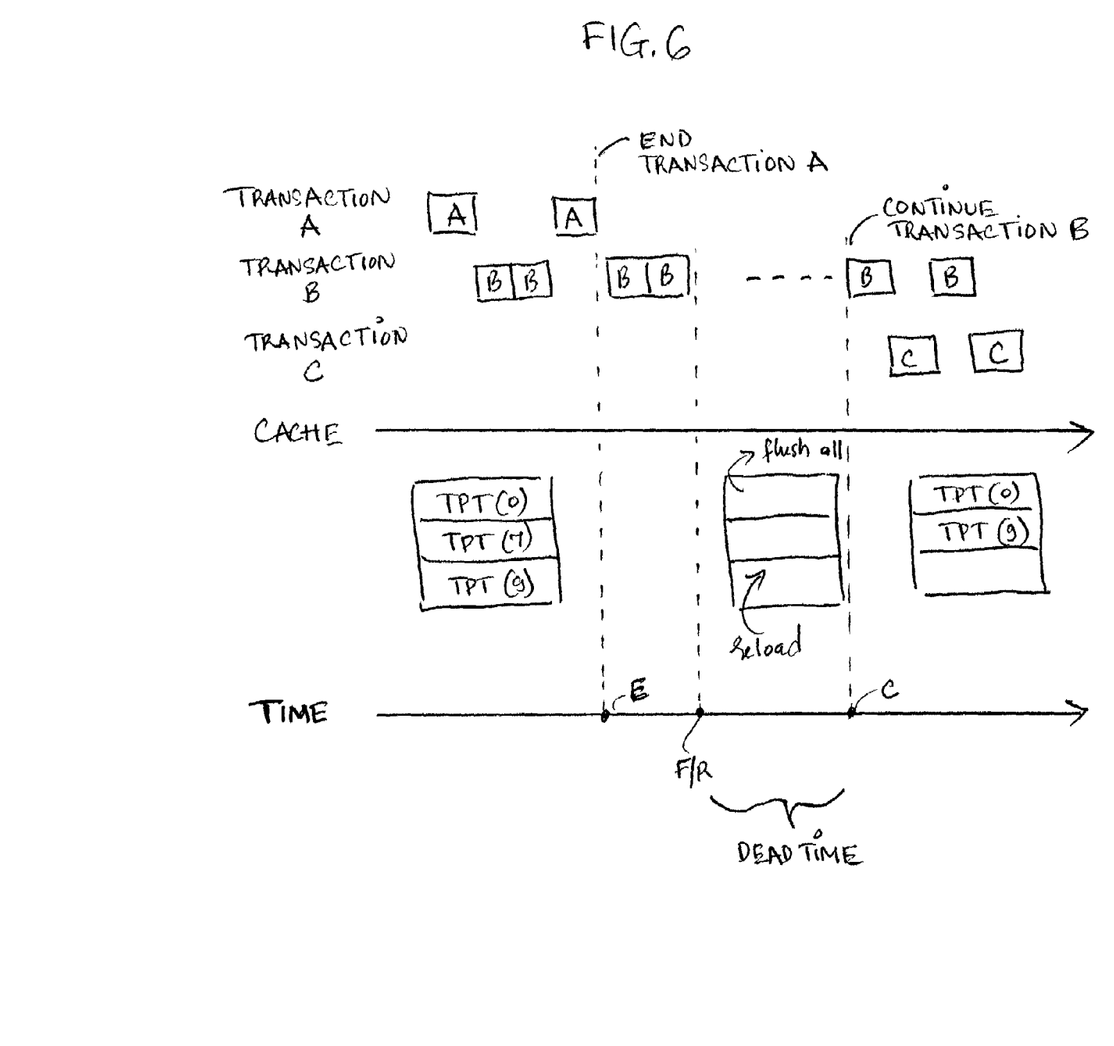
FIG. 6 illustrates an example host-fabric adapter process of flushing all cached translation and protection table (TPT) entries stored in an internal cache during I/O transactions.

FIG. 6 illustrates an example host-fabric adapter process of flushing all cached translation and protection table (TPT) entries stored in an internal cache 222 during I/O transactions. For purposes of simplicity, different transactions #A, #B and #C may be represented by simple data packets A, B and C. Cache line may represent various states of an internal cache 222 which contains a subset of TPT entries, for example, TPT(0), TPT(7) and TPT(9) being used for current I/O transactions. Time line may indicate the end of transaction #A, the dead time during the wholesale flushing of all cached translation entries (translated addresses) in an internal cache 222 and subsequent reloading of selected cached translation entries, for example, TPT(0) and TPT(9). As shown in FIG. 6, the internal cache 222 of the host-fabric adapter 220 may contain, for to example and simplicity, TPT(0), TPT(7) and TPT(9) during transaction #A. Transaction #B may be initiated during transaction #A and may request, for example, different cache addresses. In response thereto, the host-fabric adapter 222 is instructed to flush all cached translation entries, including TPT(0), TPT(7) and TPT(9) and discarded the same from internal cache 222.

Upon completion of the wholesale flush, the host-fabric adapter 222 is instructed to reload only selected re-usable cached translation entries, for example, TPT(0) and TPT(9) and new TPT entries for transaction #B. Thereafter, transaction #C may be initiated during transaction #B and may request yet different cache addresses. As described with reference to FIG. 6, transaction #B as represented by data packet B is interrupted during the wholesale flush of all cached translation entries and the reloading of selected re-usable cached translation entries. As a result, a significant delay (dead time) is undesirably incurred from the wholesale flushing and reloading operations to the continuation of transaction #B.

Figure 7:
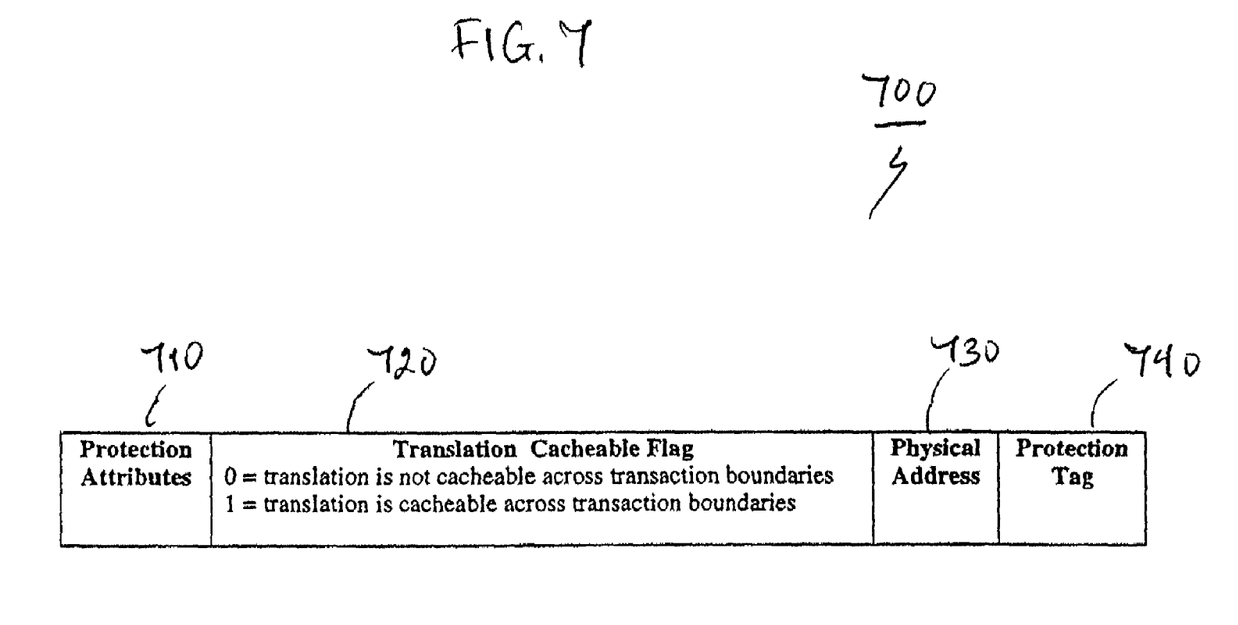
FIG. 7 illustrates an example translation and protection table (TPT) entry which uses a translation cache flag for enabling a host-fabric adapter to advantageously flush or discard only a designated TPT entry in an internal cache according to an embodiment of the present invention.

Turning now to FIG. 7, an example translation and protection table (TPT) entry which uses a translation cache flag for enabling a host-fabric adapter 220 to advantageously flush or discard only a designated single TPT entry in an internal cache 222 according to an embodiment of the present invention is illustrated. As shown in FIG. 7, each TPT entry 700 may correspond to a single registered memory page and comprise a series of protection attributes 710, a translation cacheable flag 720, a physical page address field 730, and a protection tag field 740.

Protection (memory access) attributes 710 may include, for example, a Memory Write Enable flag which indicates whether the host-fabric adapter 220 can write to page ("1" page is write-enable, "0" page is not write-enable); a RDMA Read Enable flag which indicates whether the page can be source of RDMA Read operation ("1" page can be source, "0" page cannot be source); a RDMA Write Enable flag which indicates whether the page can be target of RDMA Write operation ("1" page can be target, "0" page can not be target). Usually, the memory access attributes 710 may be used to control read and write access to a given memory region. These permissions are generally set for memory regions and virtual interfaces (VIs) when they are created, but may be modified later by changing the attributes of the memory region, and/or of the VI. If memory access attributes between a VI and a memory region do not match (during an attempted access), the attribute offering the most protection will be honored. For instance, if a VI has RDMA Read Enabled, but the memory region does not, the result is that RDMA reads on that VI from that memory region will fail. RDMA Read and Write access attributes are enforced at the remote end of a connection that is referred to by the descriptor. The Memory Write Enable access attribute is enforce for all memory access to the associated page. An attempted message transfer operation that violates a memory region's permission settings may result in a memory protection error and no data is transferred.

Translation cacheable flag 720 may be utilized to specify whether the host-fabric adapter 220 may cache addresses across transaction boundaries. If the translation cacheable flag 720 is not set ("0" flag), the host-fabric adapter 220 may flush or discard a corresponding single TPT entry from the internal cache 222 and retranslate buffer and/or descriptor addresses each time a new transaction is processed. However, if the translation cacheable flag 720 is set ("1" flag), the host-fabric adapter 220 may choose to reserve or keep the corresponding single TPT entry in the internal cache 222 for future re-use. This way only a designated TPT entry as opposed to all TPT entries stored in the cache 222 at the end of an 10 transaction may be flushed or discarded from internal cache 222. Since the host-fabric adapter 220 is instructed to flush or discard individual TPT entry as opposed to all cached TPT entries stored in the internal cache 222 at the end of an IO transaction, the number of times the host-fabric adapter 220 must flush cached address translations in the internal cache 222 may be drastically reduced. Software driver of host operating system 400 (see FIG. 4) may be used to set status of the translation cacheable flag 720 of each individual TPT entry stored in the internal cache 222.

Physical page address field 730 may include physical page frame address of entry. Memory protection tags are unique identifiers 740 that are associated both with VIs and with host memory regions to define the access permission. Memory access may be allowed by host-fabric adapter 220 if the memory protection tag of the VI and of the memory region involved are identical. Attempted memory accesses that violate this rule may result in a memory protection error and no data is transferred.

Figure 8:
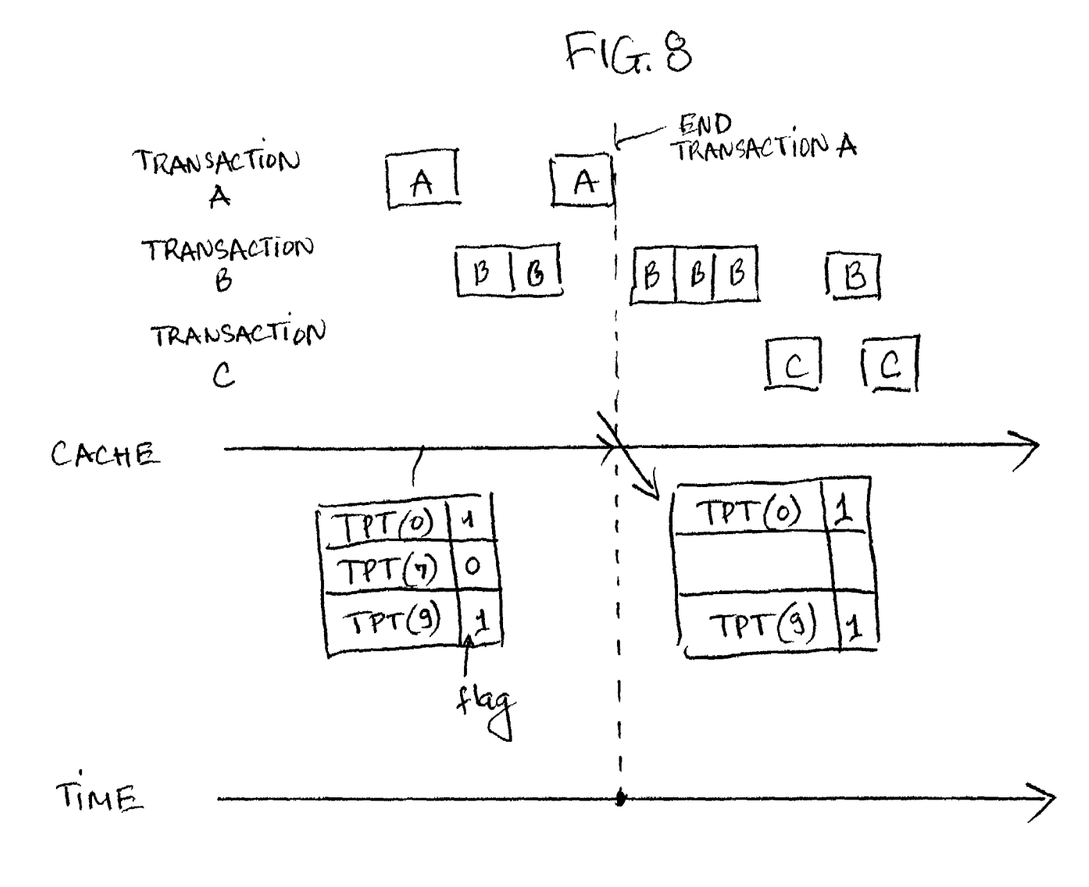
FIG. 8 illustrates an example host-fabric adapter process of flushing a designated one of cached translation and protection table (TPT) entries using a translation cache flag according to an embodiment of the present invention.

FIG. 8 illustrates a flowchart of a host-fabric adapter process of flushing a designated one of cached translation and protection table (TPT) entries using a translation cache flag 720 according to an embodiment of the present invention. Again for purposes of simplicity, different transactions #A, #B and #C may be represented by simple data packets A, B and C as described with reference to FIG. 6. Cache line may represent various states of an internal cache 222 which contains a subset of TPT entries, for example, TPT(0), TPT(7) and TPT(9) being used for current I/O transactions. Time line may indicate the end of transaction #A, the dead time during the wholesale flushing of all cached translation entries (translated addresses) in an internal cache 222 and subsequent reloading of selected cached translation entries, for example, TPT(0) and TPT(9). As shown in FIG. 8, the internal cache 222 of the host-fabric adapter 220 may also contain, for example and simplicity, TPT(0), TPT(7) and TPT(9) during transaction #A. However, each TPT entry contains a translation cacheable flag 720 which is set either "0" or "1" for enabling a host-fabric adapter 220 to advantageously flush or discard a corresponding designated TPT entry in an internal cache 222. Transaction #B may be initiated during transaction #A and may request, for example, different cache addresses. In response thereto, the host-fabric adapter 222 is instructed by the translation cacheable flag 720 to flush a corresponding cached translation entry that is set as "0", for example, TPT(7) and discarded the same from internal cache 222. Thereafter, transaction #C may be initiated during transaction #B and may request yet different cache addresses. Transaction #B as represented by data packet B may be carried on without interruption. As a result, no delay (dead time) is incurred from the flush and reload operation to the continuation of transaction #B.

For purposes of completeness, data transfer operations between host 110 and I/O units and I/O controllers attached to the switched fabric 102 using TPT entries stored in an internal cache 222 of a host-fabric adapter 220 as shown in FIGS. 5-8 may be described as follows. Data transfer requests may be represented by descriptors. There are two general types of descriptors, send/receive and read/write (RDMA). Descriptors are data structures organized as a list of segments. Each descriptor may begin with a control segment followed by an optional address segment and an arbitrary number of data segments. Control segments may contain control and status information. Address segments, for read/write operations, may contain remote buffer information (i.e., memory associated with the VI targeted to receive the read/write request). Data segments, for both send/receive and read/write operations, may contain information about the local memory (i.e., memory associated with the VI issuing the send/receive or read/write request).

Figure 9A:
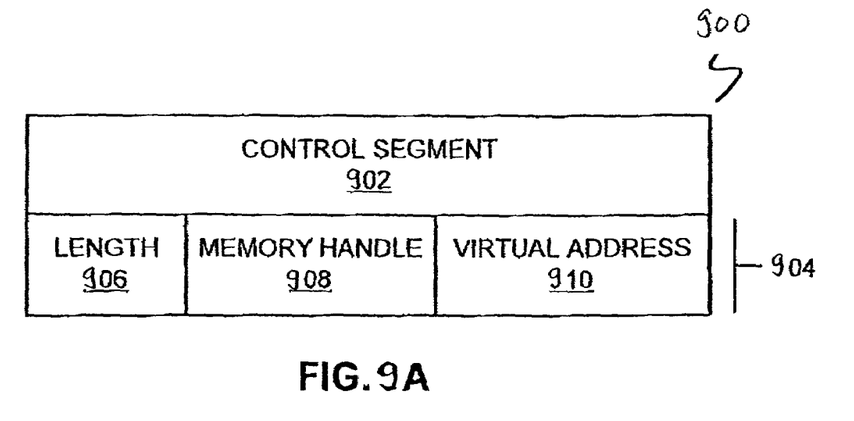
FIGS. 9A and 9B illustrate different examples of VI architecture descriptors.

FIG. 9A illustrates an example send/receive type descriptor 900 having a control segment 902 and a data segment 904. Data segment 904, in turn, has a segment length field 906, a memory handle field 908, and a virtual address field 910. Segment length 906 specifies the length of the message to be sent or that is to be received. Memory handle 908 may be used to verify that the sending/requesting process (i.e., VI) owns the registered memory region indicated by segment length 904 and virtual address 910. For a send operation, virtual address 910 identifies the starting memory location of the message (data) to be sent in the sending VI's local memory space. For a receive operation, virtual address 910 identifies the starting memory location of where the received message(data) is to be stored in the requesting VI's local memory space.

Figure 9B:
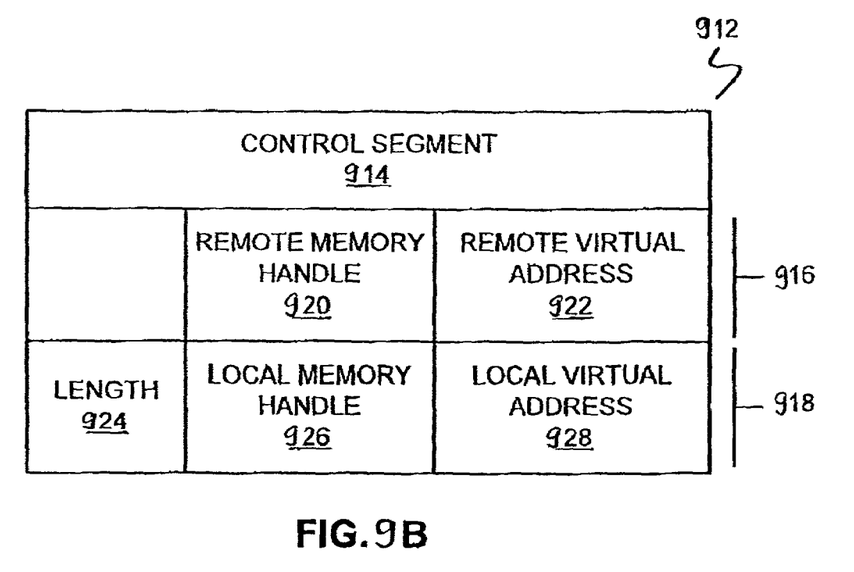

FIG. 9B illustrates an example read/write type descriptor 912 having a control segment 914, an address segment 916, and a data segment 918. Address segment 916 has a remote memory handle field 920 and a remote virtual address field 922. Data segment 918 has a segment length field 924, a local memory handle field 926, and a local virtual address field 928. For a read operation, remote virtual address 922 identifies the memory location in the remote process' memory space, of the message (data) to be read. Local virtual address 928 identifies the starting memory location in the local process' memory space of where the received message is to be placed. The amount of memory to be used to store the message is specified by segment length field 924. For a write operation, remote virtual address 922 identifies the memory location in the 15 local process' memory space of the message (data) to be written. Local virtual address 928 identifies the starting memory location in the local process' memory space of where the message being written is stored. The size of the message is specified by segment length field 924. Remote memory handle 920 is that memory handle associated with the memory identified by remote virtual address 922. Local memory handle 926 is that memory handle associated with the memory identified by local virtual address 928.

When a descriptor is processed by the host-fabric adapter 220, the virtual address and the associated memory handle may be used to generate a protection index. The protection index is used to identify a TPT entry of internal cache 222 that corresponds to a single page of registered memory on which the posted descriptor is located. From the identified TPT entry of internal cache 220, the physical address associated with virtual address may be obtained. In send and receive operations, virtual address and memory handle correspond to memory handle field 908 and virtual address field 910 of FIG. 9A. In read and write operations, virtual address and memory handle correspond to remote memory handle 920 and remote virtual address field 922 on the remote host-fabric adapter, and local memory handle field 926 and local virtual address field 928 on the local host-fabric adapter 220 of FIG. 9B.

Figure 10:
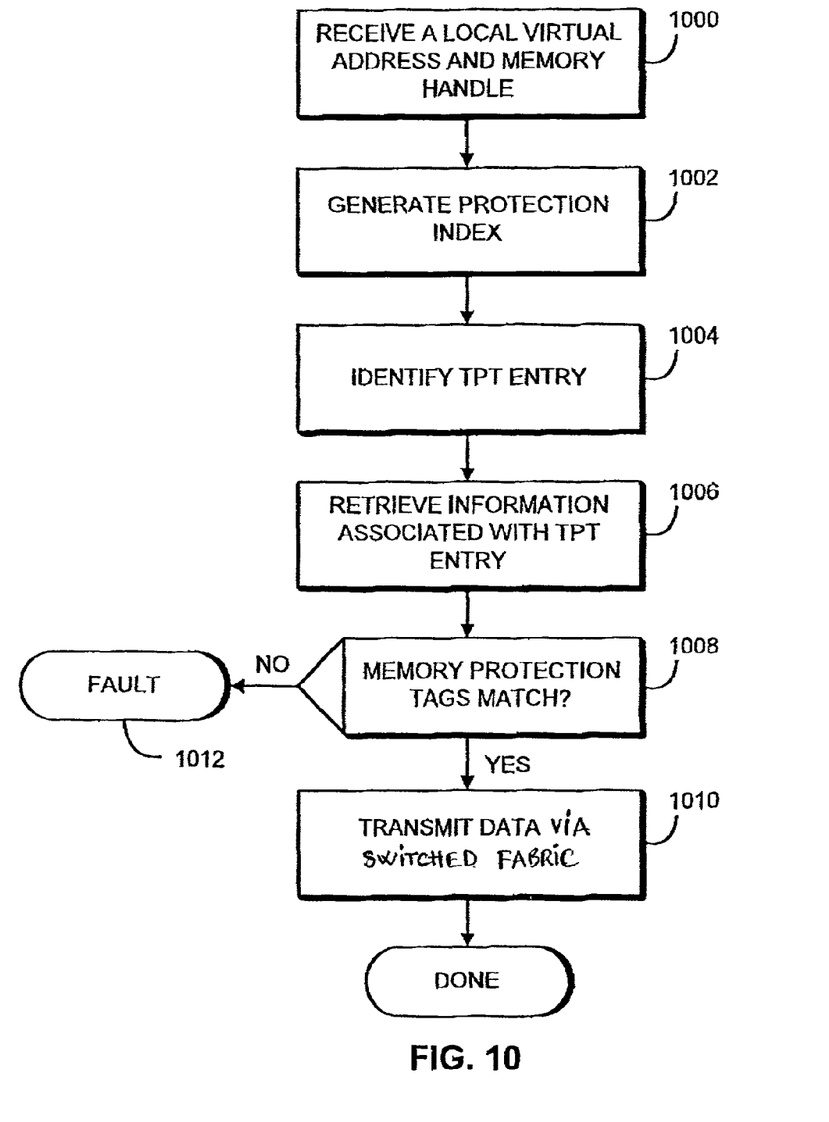
FIG. 10 illustrates an example send processing technique according to an embodiment of the present invention.

An example send descriptor may be processed by the host-fabric adapter 220 in the manner as shown in FIG. 10. In step 1000, the host-fabric adapter 220 retrieves the message's starting virtual address 910 (in the local, or sending process' memory space), and a memory handle 908 associated with the message's memory region. Virtual address 910 and memory handle 908 may be used to generate a protection index (step 1002). The protection index is used to identify and retrieve translation information stored in a TPT entry of internal cache 222 that corresponds to a single page of registered memory on which the posted descriptor is located (steps 1004 and 1006). If the retrieved protection tag matches the protection tag associated with the local (sending) process ('yes' prong of step 1008), the host-fabric adapter 220 sends the message toward the destination (remote) by transmitting the same (the message or data) via the switched fabric 102 (see FIGS. 1-3). If the retrieved protection tag and the sending process' protection tag do not match ('no' prong of step 1008), a memory protection fault may be generated (step 1012) and no data is transferred via the switch fabric 102. Receive descriptors may be processed in an analogous fashion.

Figure 11:
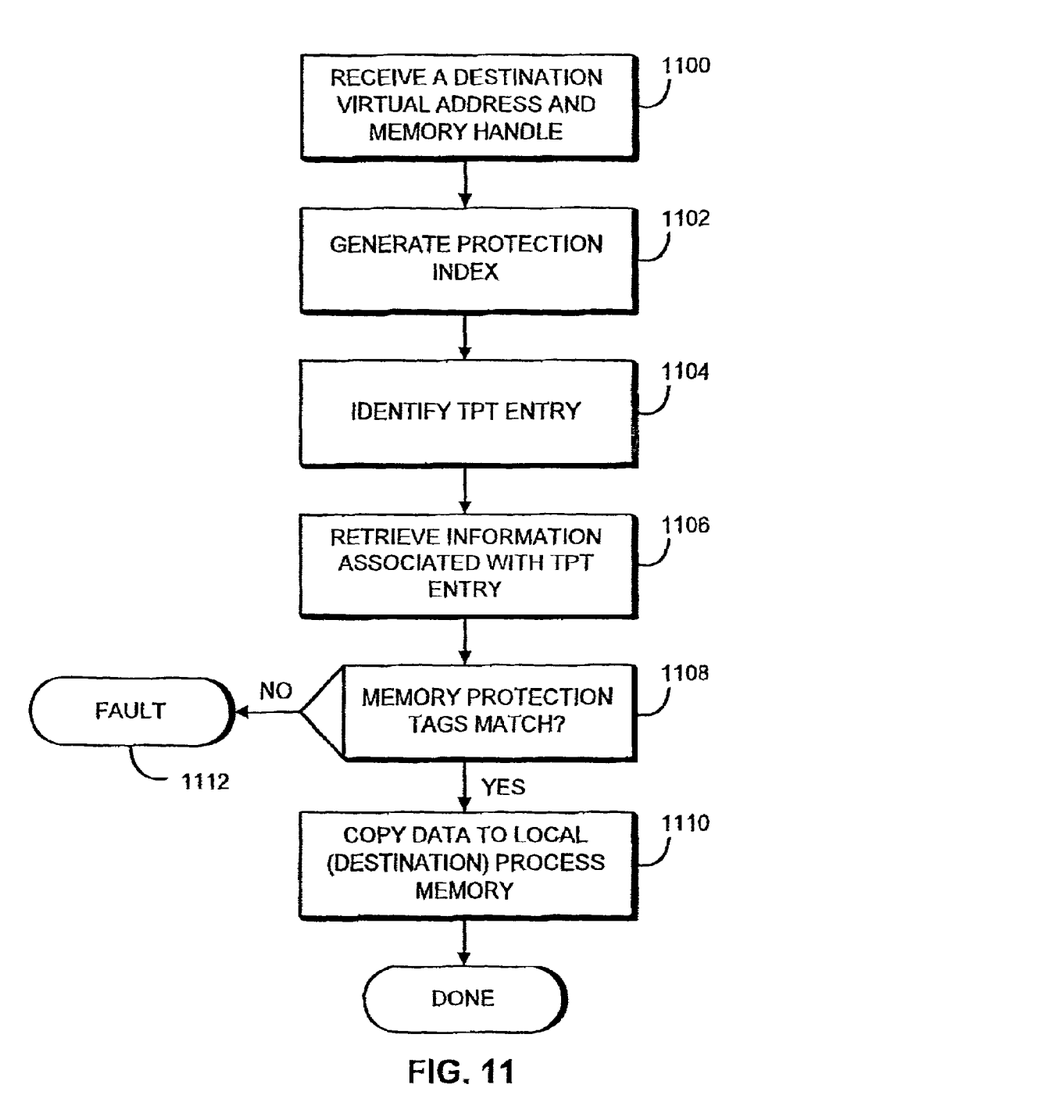
FIG. 11 illustrates an example write processing technique according to an embodiment of the present invention.

Similarly, an example read descriptor may be processed by the host-fabric adapter 220 in the manner as shown in FIG. 11. In step 1100, the host-fabric adapter 220 retrieves the message's destination virtual address 928 (in the local, or receiving process' memory space), a memory handle 926 associated with the message's destination memory region, and indication of how long the incoming message is 924. The virtual address 928 and memory handle 926 may be used to generate a protection index (step 1102). The protection index is used to identify and retrieve translation information stored in a TPT entry of internal cache 222 that corresponds to a single page of registered memory on which the posted descriptor is located (steps 1104 and 1106). If the retrieved protection tag matches the protection tag associated with the local (receiving) process ('yes' prong of step 1108), the host-fabric adapter 220 copies the message into the local process' memory. If the retrieved protection tag and the receiving process' protection tag do not match ('no' prong of step 1108), a memory protection fault is generated (step 1112) and no data is transferred via the switched fabric 102. Write descriptors may be processed in an analogous fashion.

As described from the foregoing, the present invention advantageously provides a translation cacheable flag for use to specify whether a host-fabric adapter may cache addresses across transaction boundaries. This way only a designated TPT entry as opposed to call TPT entries stored in an internal cache of the host-fabric adapter at the end of an IO transaction may be flushed or discarded in order to drastically reduce the number of times the host-fabric adapter to flush cached address translations in the internal cache. As a result, the host-fabric adapter which caches address translations may differentiate among different caching policies on a page by page basis.

While there have been illustrated and described what are considered to be exemplary embodiments of the present invention, it will be understood by those skilled in the art and as technology develops that various changes and modifications may be made, and equivalents may be substituted for elements thereof without departing from the true scope of the present invention. For example, the present invention is applicable to all types of redundant type networks, including, but not limited to, Next Generation Input/Output (NGIO), ATM, SAN (system area network, or storage area network), server net, Future Input/Output (FIO), fiber channel, Ethernet). In addition, method steps of FIGS. 10 and 11 may be performed by a computer processor executing instructions organized into a program module or a custom designed state machine. Storage devices suitable for tangibly embodying computer program instructions include all forms of non-volatile memory including, but not limited to: semiconductor memory devices such as EPROM, EEPROM, and flash devices; magnetic disks (fixed, floppy, and removable); other magnetic media such as tape; and optical media such as CD-ROM disks. Many modifications may be made to adapt the teachings of the present invention to a particular situation without departing from the scope thereof Therefore, it is intended that the present invention not be limited to the various exemplary embodiments disclosed, but that the present invention includes all embodiments falling within the scope of the appended claims.

What is claimed is:

1. A host coupled to a switched fabric including one or more fabric-attached I/O controllers, comprising:
   a processor;
   a host memory coupled to said processor; and
   a host-fabric adapter coupled to said processor and provided to interface with said switched fabric, including an internal cache to store selected translation and protection table (TPT) entries from said host memory for a data transaction, each TPT entry comprising protection attributes to control read and write access to a given memory region of said host memory, a translation cacheable flag to specify whether said host-fabric adapter is to flush a corresponding TPT entry, a physical page address field to address a physical page frame of data entry, and a memory protection tag to specify whether said host-fabric adapter has permission to access said host memory
   wherein said host-fabric adapter is configured to flush individual cached TPT entries from said internal cache in accordance with the corresponding translation cacheable flag.

2. The host as claimed in claim 1, wherein each of said selected TPT entries represents translation of a single page of said host memory.

3. The host as claimed in claim 1, wherein said host-fabric adapter is provided to perform virtual to physical address translations and validate access to said host memory using said selected TPT entries.

4. The host as claimed in claim 1, wherein said protection attributes comprise a Memory Write Enable flag to indicate whether said host-fabric adapter can write to a page; a RDMA Read Enable flag to indicate whether the page can be a source of a RDMA Read operation; a RDMA Write Enable flag to indicate whether the page can be a target of a RDMA Write operation.

5. The host as claimed in claim 1, wherein said host-fabric adapter flushes a designated cached TPT entry from said internal cache when said translation cacheable flag of said designated cached TPT entry indicates a first logical state, and maintains said designated cached translation cacheable flag of said designated cached TPT entry in said internal cache when said translation cacheable flag of said designated cached TPT entry indicates a second logic state opposite of said first logic state.

6. The host as claimed in claim 1, further comprising an operating system including driver software which sets status of said translation cacheable flag per TPT entry for enabling said host-fabric adapter to flush individual cached TPT entry from said internal cache.

7. A network, comprising:
   a switched fabric
   I/O controllers attached to said switched fabric; and
   a host comprising an operating system, a host memory, and a host-fabric adapter including translation and protection table (TPT) entries, each TPT entry comprising protection attributes to control read and write access to a given memory region of the host memory, a translation cacheable flag to specify whether the host-fabric adapter is to flush a corresponding TPT entry, a physical page address field to address a physical page frame of data entry, and a memory protection tag to specify whether the host-fabric adapter has permission to access said host memorys
   wherein the host-fabric adapter is configured to cache selected TPT entries from the host memory and to flush individual cached TPT entries in accordance with the corresponding translation cacheable flag.

8. The network as claimed in claim 7, wherein said host-fabric adapter comprises an internal cache to store said selected TPT entries from said host memory.

9. The network as claimed in claim 7, wherein each of said selected TPT entries represents translation of a single page of said host memory.

10. The network as claimed in claim 7, wherein said host-fabric adapter is provided to perform virtual to physical address translations and validate access to said host memory using said selected TPT entries.

11. The network as claimed in claim 7, wherein said protection attributes comprise a Memory Write Enable flag to indicate whether said host-fabric adapter can write to page; a RDMA Read Enable flag to indicate whether the page can be a source of a RDMA Read operation; a RDMA Write Enable flag to indicate whether the page can be a target of a RDMA Write operation.

12. The network as claimed in claim 8, wherein said host-fabric adapter flushes a designated cached TPT entry from said internal cache when said translation cacheable flag of said designated cached TPT entry indicates a first logical state, and maintains said designated cached TPT entry in said internal cache for future re-use when said translation cacheable flag of said designated cached TPT entry indicates a second logic state opposite of said first logic state.

13. An apparatus, comprising:
   a host-fabric adapter provided to interface with a switched fabric
   a storage device to store translation and protection table (TPT) entries physical address translations, wherein each of said TPT entries include protection attributes to control read and write access to a given memory region of a host memory and a memory protection tag to specify whether said apparatus has permission to access said host memory; and
   a mechanism to flush individual TPT entries stored in the storage device in accordance with a corresponding translation cacheable flag included in the individual TPT entry wherein said protection attributes comprise a Memory Write Enable flag to indicate whether said apparatus can write to page: a RDMA Read Enable flag to indicate whether the page can be a source of a RDMA Read operation: a RDMA Write Enable flag to indicate whether the page can be a target of a RDMA Write operation.

14. The apparatus as claimed in claim 13, wherein the storage device corresponds to an internal cache for storing said TPT entries.

15. The apparatus as claimed in claim 13, wherein each of said TPT entries represents translation of a single page of a host memory.

16. The apparatus as claimed in claim 14, wherein each of said TPT entries comprises:
   said translation cacheable flag to specify whether said apparatus is to flush a corresponding translation and protection table (TPT) entry stored in said internal cache; and
   a physical page address field to address a physical page frame of data entry.

17. A method, comprising:

storing, in a cache of an adapter installed in a host system and provided to interface a switched fabric, translation and protection table (TPT) entries from a host memory for virtual to physical address translations and access validation to the host memory during I/O transactions, each of the TPT entries corresponds to a memory portion of the host memory and comprises at least a translation cacheable flag and a memory protection tag to specify whether the adapter has permission to access the host memory; and checking a status of the translation cacheable flag of each one or more selected TPT entries stored in the cache of the adapter to determine whether to discard one or more selected TPT entries from the cache of the adapter wherein each of the TPT entries comprises:

protection attributes which control read and write access to a given memory region of the host memory said translation cacheable flag specifies whether the adapter is to flush a corresponding translation and protection table (TPT) entry stored in the cache; and a physical page address field which addresses a physical page frame of data entry.

18. The method as claimed in claim 17, further comprising a step of setting the status of the translation cacheable flag per TPT entry, using an operating system (OS), for enabling the adapter to discard individual TPT entries from the cache.

19. The method as claimed in claim 17, wherein each of the TPT entries represents translation of a single page of host memory.

20. The method as claimed in claim 17, wherein said protection attributes comprise a Memory Write Enable flag which indicates whether the adapter can write to a page of the host memory; a RDMA Read Enable flag which indicates whether the page can be a source of a RDMA Read operation; a RDMA Write Enable flag which indicates whether the page can be a target of a RDMA Write operation.

21. An adapter in a host system provided to interface a switched fabric, comprising:

a cache to store translation and protection table (TPT) entries from a host memory for virtual to physical address translations and access validation to the host memory during I/O transactions, each of the TPT entries corresponds to a memory portion of the host memory and comprises at least a translation cacheable flag and a memory protection tag to specify whether the adapter has permission to access the host memory; and a mechanism to determine a status of the translation cacheable flag of each one or more selected TPT entries stored in the cache, and to discard the one or more selected TPT entries from the cache based on the status of the translation cacheable flag wherein each of the TPT entries comprises:

protection attributes which control read and write access to a given memory region of the host memory;

said translation cacheable flag specifies whether the adapter is to flush a corresponding translation and protection table (TPT) entry stored in the cache; and a physical page address field which address a physical page frame of data entry.

22. The adapter as claimed in claim 21, further comprising an operating system (OS) to set the status of the translation cacheable flag per TPT entry for enabling the adapter to discard individual TPT entries from the cache.

23. The adapter as claimed in claim 21, wherein each of the TPT entries represents translation of a single page of host memory.

24. The adapter as claimed in claim 21, wherein said protection attributes comprise a Memory Write Enable flag which indicates whether the adapter can write to a page of the host memory; a RDMA Read Enable flag which indicates whether the page can be a source of a RDMA Read operation; a RDMA Write Enable flag which indicates whether the page can be a target of RDMA Write a operation.

* * * * *